(12) United States Patent
Nishimoto et al.

(10) Patent No.: US 11,249,505 B2
(45) Date of Patent: Feb. 15, 2022

(54) OPERATION KNOB DEVICE

(71) Applicants: Japan Display Inc., Tokyo (JP);
U-Shin Ltd., Nagano (JP)

(72) Inventors: Takuya Nishimoto, Tokyo (JP); Nobuo Tsubokura, Tokyo (JP); Kaoru Taketa, Tokyo (JP); Kenji Ito, Hiroshima (JP)

(73) Assignees: JAPAN DISPLAY LTD., Tokyo (JP);
U-SHIN LTD., Nagano (JP)

( * ) Notice: Subject to any disclaimer, the term of this patent is extended or adjusted under 35 U.S.C. 154(b) by 0 days.

(21) Appl. No.: 17/197,251

(22) Filed: Mar. 10, 2021

(65) Prior Publication Data
US 2021/0303019 A1    Sep. 30, 2021

(30) Foreign Application Priority Data

Mar. 30, 2020 (JP) .............................. JP2020-059296

(51) Int. Cl.
*G06F 3/03* (2006.01)
*G06F 3/0362* (2013.01)
(Continued)

(52) U.S. Cl.
CPC ............... *G05G 1/10* (2013.01); *B60K 37/06* (2013.01); *G06F 3/0362* (2013.01); *B60K 2370/126* (2019.05)

(58) Field of Classification Search
CPC .... G05G 1/10; B60K 37/06; B60K 2370/126; G06F 3/0362; F16C 7/082; F24C 3/126
(Continued)

(56) References Cited

U.S. PATENT DOCUMENTS 5,619,021 A * 4/1997 Yamamoto ......... G05G 9/04796
200/6 A
5,841,428 A * 11/1998 Jaeger ................... G02F 1/1345
345/184
(Continued)

FOREIGN PATENT DOCUMENTS

| WO | 2015/174092 | 11/2015 | | |
|---|---|---|---|---|
| WO | WO 2020246076 A1 * | 12/2020 | ............. | H01H 25/04 |
| WO | WO 2021084811 A1 * | 5/2021 | ................ | G06F 3/03 |

OTHER PUBLICATIONS

EPO Machine Translation of Description of WO 2021084811 A1, Sugiura et al., May 2021 (Year: 2021).*
(Continued)

*Primary Examiner* — Vinh Luong
(74) *Attorney, Agent, or Firm* — Wenderoth, Lind & Ponack, L.L.P.

(57) ABSTRACT

An operation knob device includes an annular holder having an annular holding portion, an annular rotor arranged in the holding portion so as to allow rotation around an axis, an annular knob for which relative movement in a direction along the axis with respect to the rotor is allowed and relative movement in a circumferential direction around the axis is restricted, a first transmission member arranged on a side of a first end of the rotor so as to move with the knob, and a second transmission member attached to the first end so as to rotate integrally with the rotor. The knob has cylindrical inner and outer wall portions, and an opening through which part of a display panel can be visually recognized is defined by the inner wall portion. The first and second transmission members are arranged between the inner wall portion and the outer wall portion.

4 Claims, 12 Drawing Sheets

(51) Int. Cl.
　　　*G06F 3/041*　　　(2006.01)
　　　*G06F 3/044*　　　(2006.01)
　　　*G05G 1/10*　　　(2006.01)
　　　*B60K 37/06*　　　(2006.01)

(58) Field of Classification Search
　　　USPC .......................................................... 74/553
　　　See application file for complete search history.

(56) References Cited

U.S. PATENT DOCUMENTS

| | | | |
|---|---|---|---|
| 2005/0284737 A1* | 12/2005 | Shitanaka | G05G 9/047 |
| | | | 200/5 R |
| 2017/0052617 A1 | 2/2017 | Okuzumi et al. | |
| 2019/0146594 A1* | 5/2019 | Nakagawa | G06F 3/041 |
| | | | 345/174 |
| 2021/0240305 A1* | 8/2021 | Takada | H01H 19/14 |

OTHER PUBLICATIONS

EPO Machine Translation of Description of WO 2020246076 A1, Yoshihara et al., Dec. 2020 (Year: 2020).*

* cited by examiner

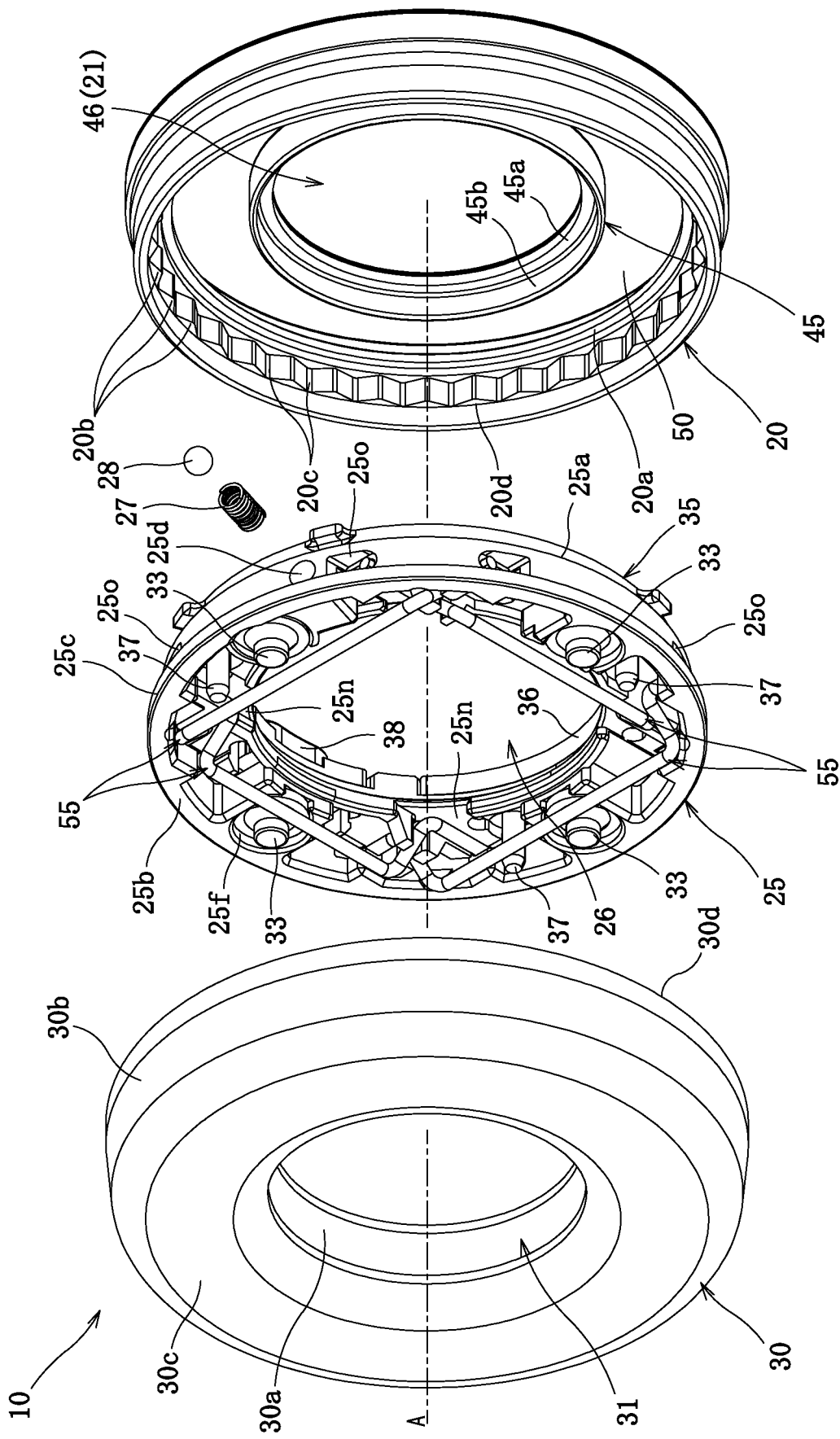

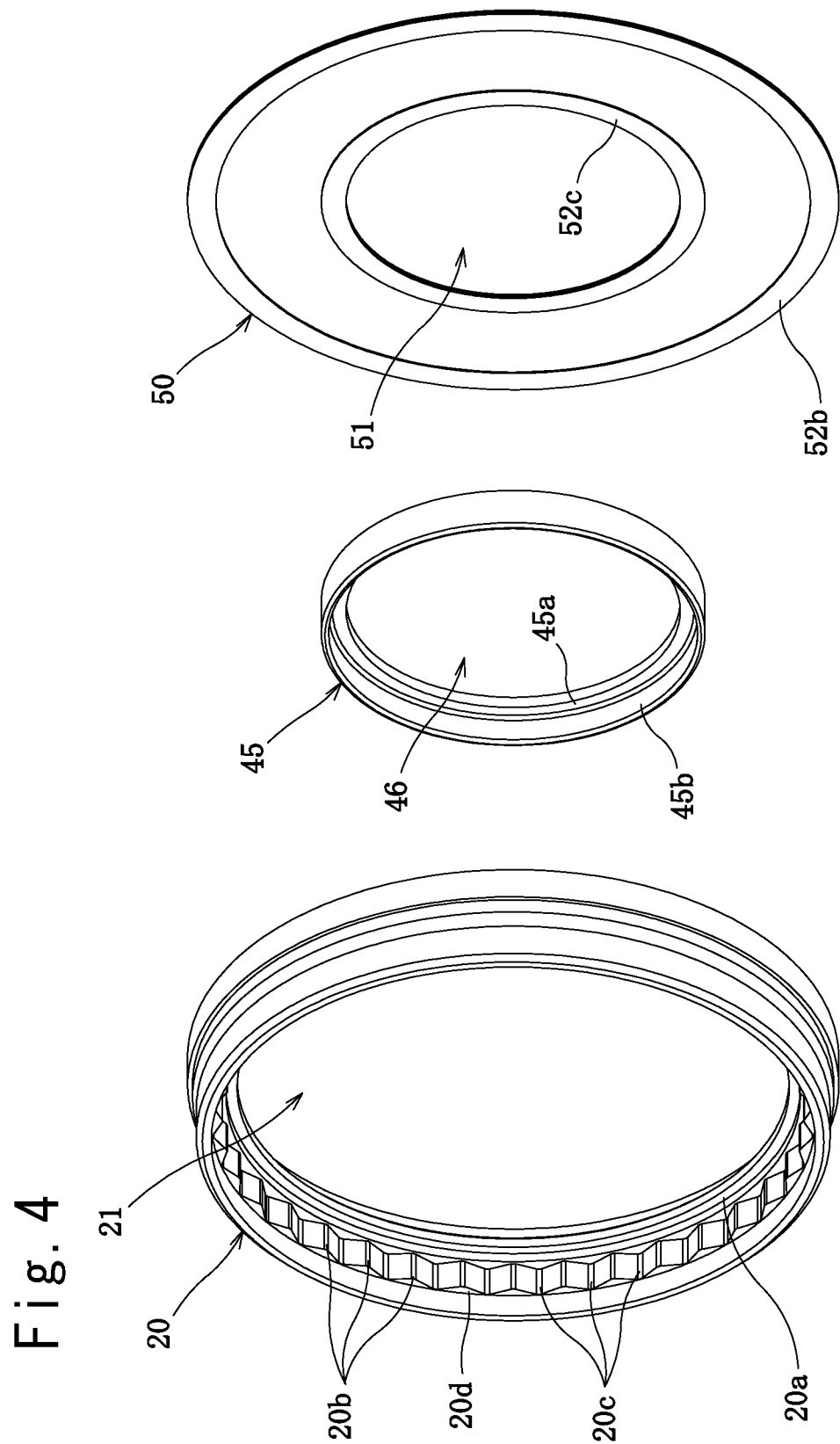

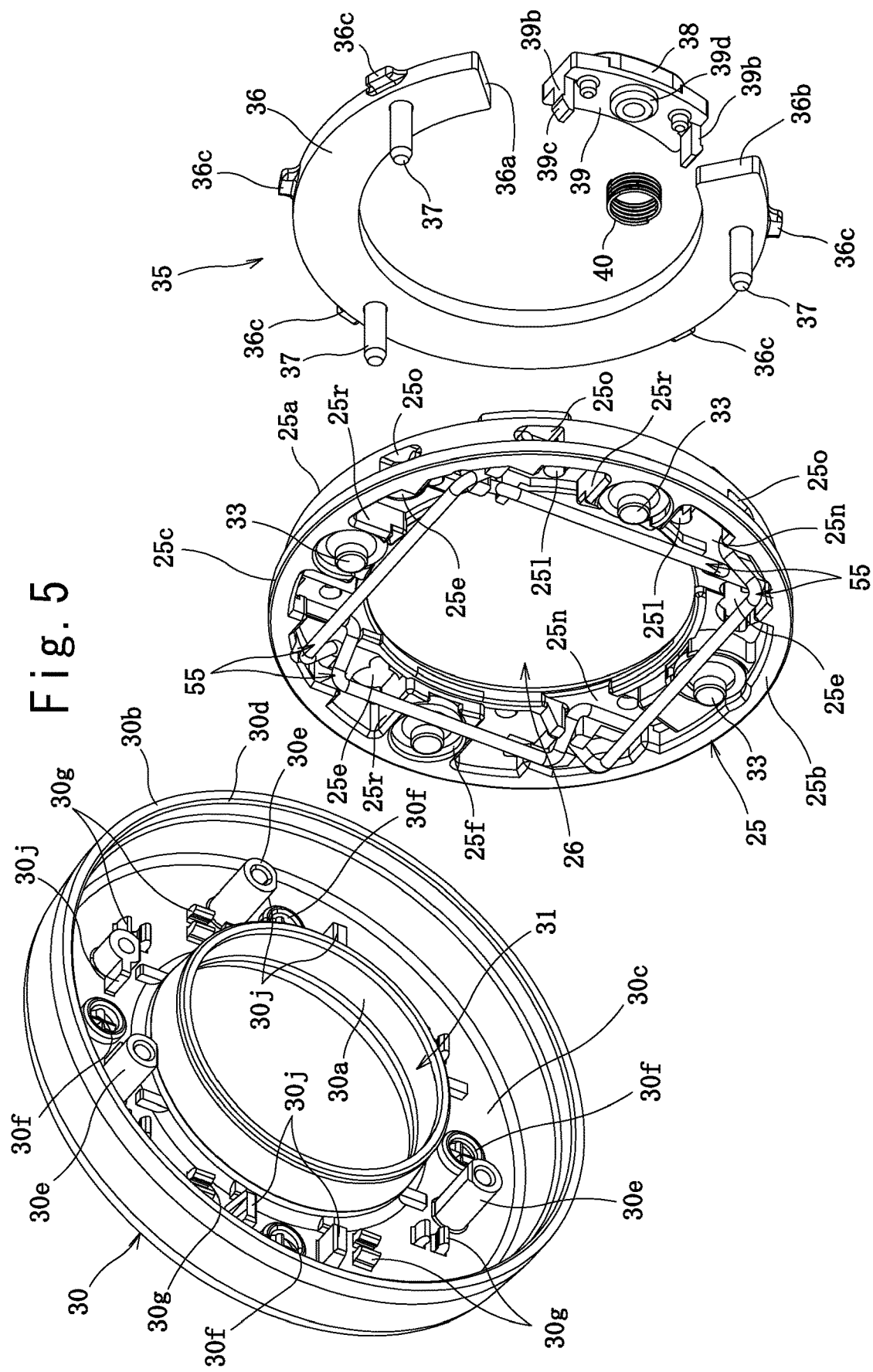

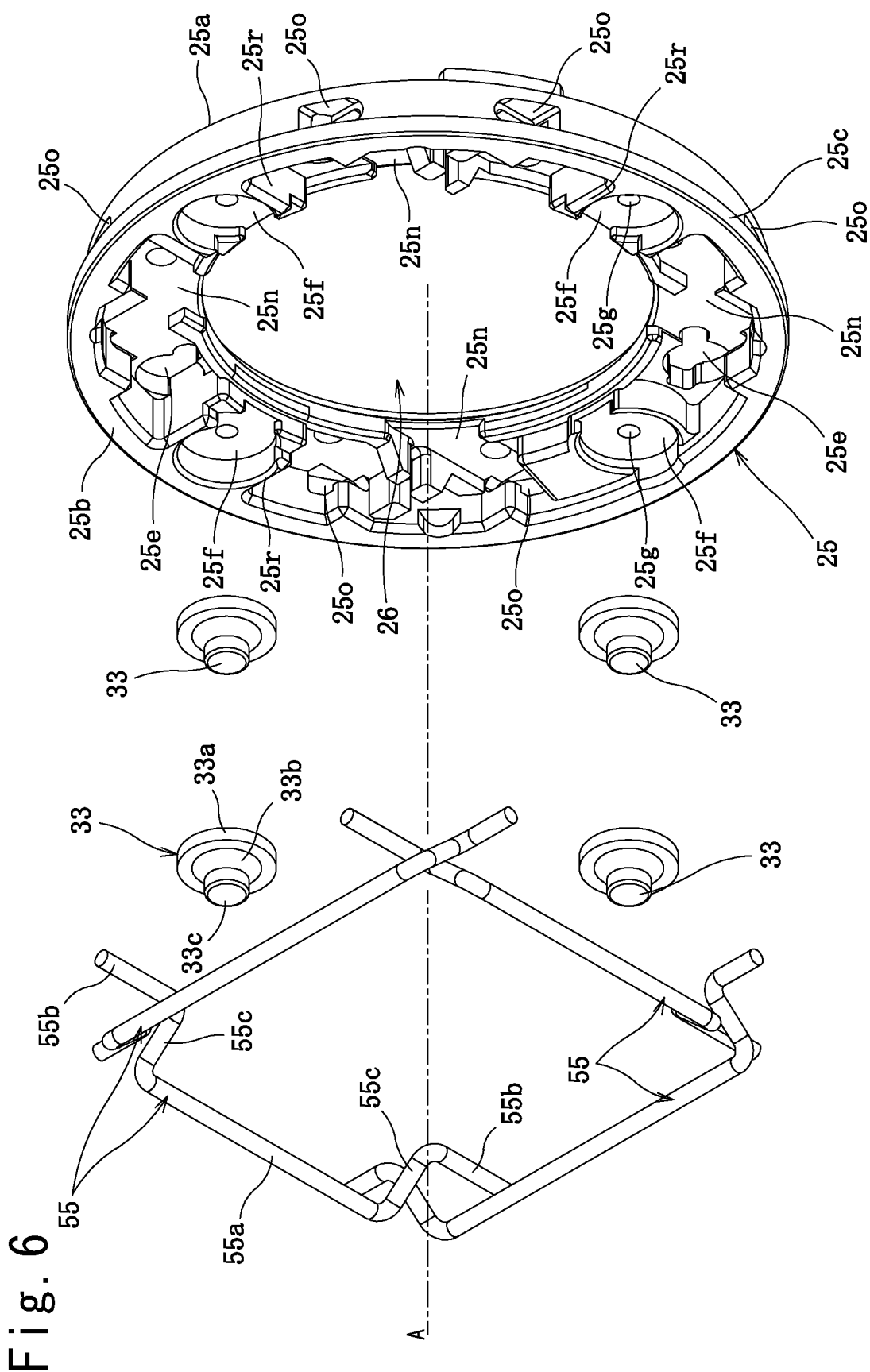

OPERATION KNOB DEVICE

BACKGROUND OF THE INVENTION

Technical Field

The present invention relates to an operation knob device.

Description of the Related Art

An in-vehicle product such as a navigation device or a center display is mounted with a display panel having a capacitive touch detection function. Since it is necessary to put a finger on a defined operation area of a display panel having no unevenness when operating an in-vehicle product, and the user needs to visually confirm the position of the operation area.

WO 2015/174092 discloses an operation knob device arranged on the surface of a display panel. The operation knob device includes a holder fixed to the display panel, a push-type button, and a rotary knob. The display panel can detect the push operation of a button as the capacitance of the display panel is changed due to the approach of a transmission member in the button. The display panel can detect the rotation operation of the knob as the position where the capacitance changes is moved by the transmission member in the knob. Since the operation knob device protrudes from the display panel, the user can operate the in-vehicle product without looking at the display panel.

SUMMARY OF THE INVENTION

In the operation knob device of Patent Literature 1, the area where the operation knob device is arranged on the display panel is covered and hidden. Therefore, there is room for improvement in the operation knob device of Patent Literature 1 regarding securing the display area of the display panel.

An object of the present invention is to provide an operation knob device in which both push operation and rotation operation can be transmitted to a display panel and a display area of the display panel can be secured.

According to an aspect of the present invention, there is provided an operation knob device including an annular holder having an annular holding portion and arranged adjacent to a display panel so that an axis of the holding portion intersects with the display panel, an annular rotor that has a first end facing the display panel and a second end located on a side opposite to the display panel with respect to the first end, and is arranged in the holding portion so as to allow rotation around the axis, an annular knob arranged on a side of the second end of the rotor so that relative movement in a direction along the axis with respect to the rotor is allowed and relative movement in a circumferential direction around the axis with respect to the rotor is restricted, a conductive first transmission member arranged on a side of the first end of the rotor so as to move along the axis in conjunction with the knob, and a conductive second transmission member attached to the first end so as to rotate integrally with the rotor. The knob has a cylindrical inner wall portion that defines an opening through which part of the display panel can be visually recognized through an internal space of the holder and the rotor, and a cylindrical outer wall portion that surrounds an outer side of the inner wall portion, and the first transmission member and the second transmission member are arranged between the inner wall portion and the outer wall portion.

When the knob is pushed, the first transmission member arranged on the side of the first end of the rotor moves integrally toward the display panel. The display panel can detect the push operation of the knob as the capacitance is changed due to the approach of the first conductive member having conductivity. When the knob is rotated, the rotor and the second transmission member attached to the side of the first end rotate integrally. The display panel can detect the rotation operation of the knob as the position where the capacitance changes moves due to the rotation of the second transmission member having conductivity.

Since the holder, the rotor, and the knob are formed in an annular shape and part of the display panel can be visually recognized through an internal space of these, the display area of the display panel can be secured. Since the first transmission member and the second transmission member are collectively arranged between the inner wall portion and the outer wall portion of the knob, the operation knob device can be reduced in size.

In the operation knob device of the present invention, both the push operation and the rotation operation can be reliably transmitted to the display panel, and the display area of the display panel can be secured.

BRIEF DESCRIPTION OF THE DRAWINGS

FIG. 3 is an exploded perspective view of the operation knob device of FIG. 2;

FIG. 4 is an exploded perspective view of a holder, a ring member, and a film of FIG. 3;

FIG. 5 is an exploded perspective view of a rotor, a first transmission member, a second transmission member, and a knob of FIG. 3;

FIG. 6 is an exploded perspective view of the rotor, an energizing member, and a stabilizer;

DETAILED DESCRIPTION OF THE PREFERRED EMBODIMENTS

Hereinafter, an embodiment of the present invention will be described with reference to the drawings.

First Embodiment

Figure 1:
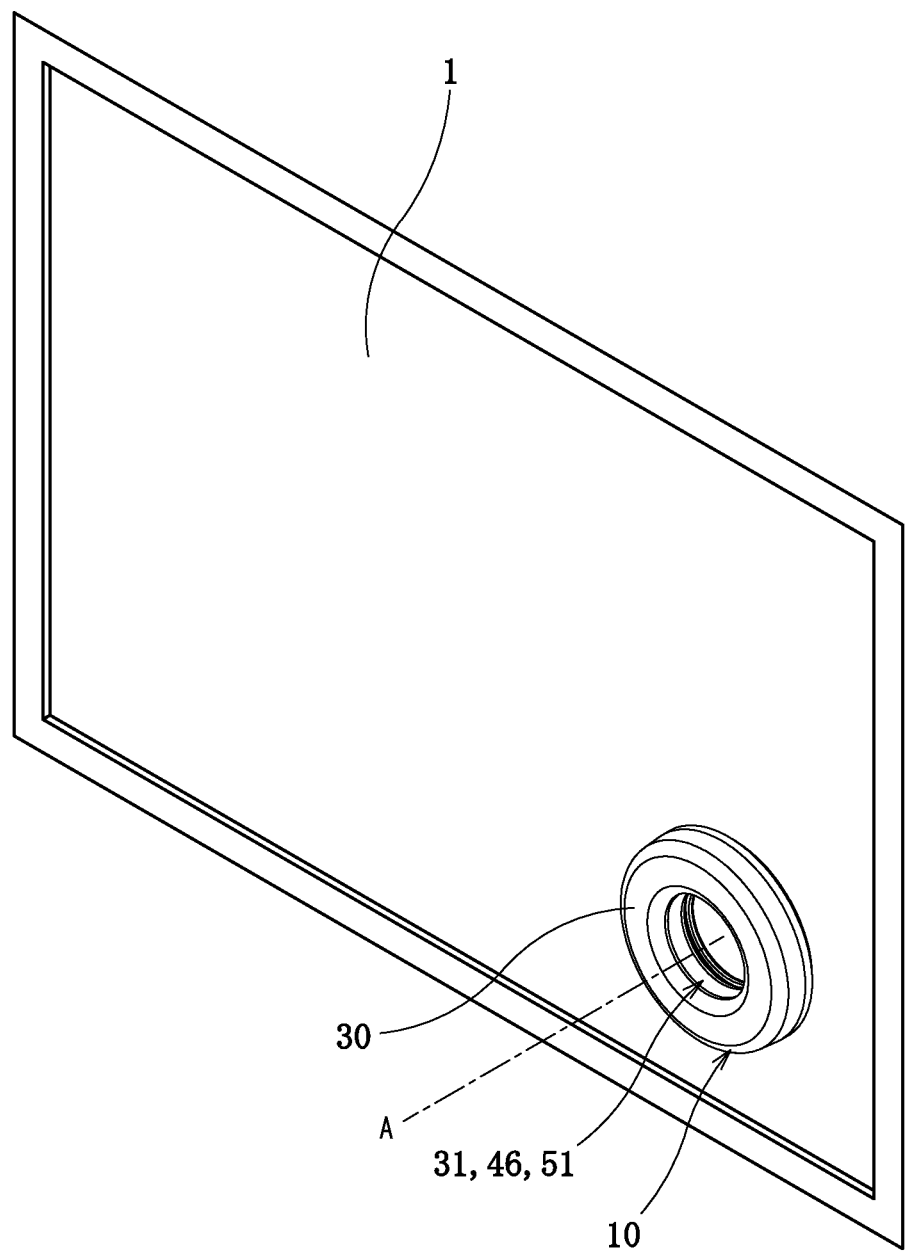
FIG. 1 is a perspective view in which an operation knob device according to an embodiment of the present invention is arranged on a display panel.
Figure 2A:
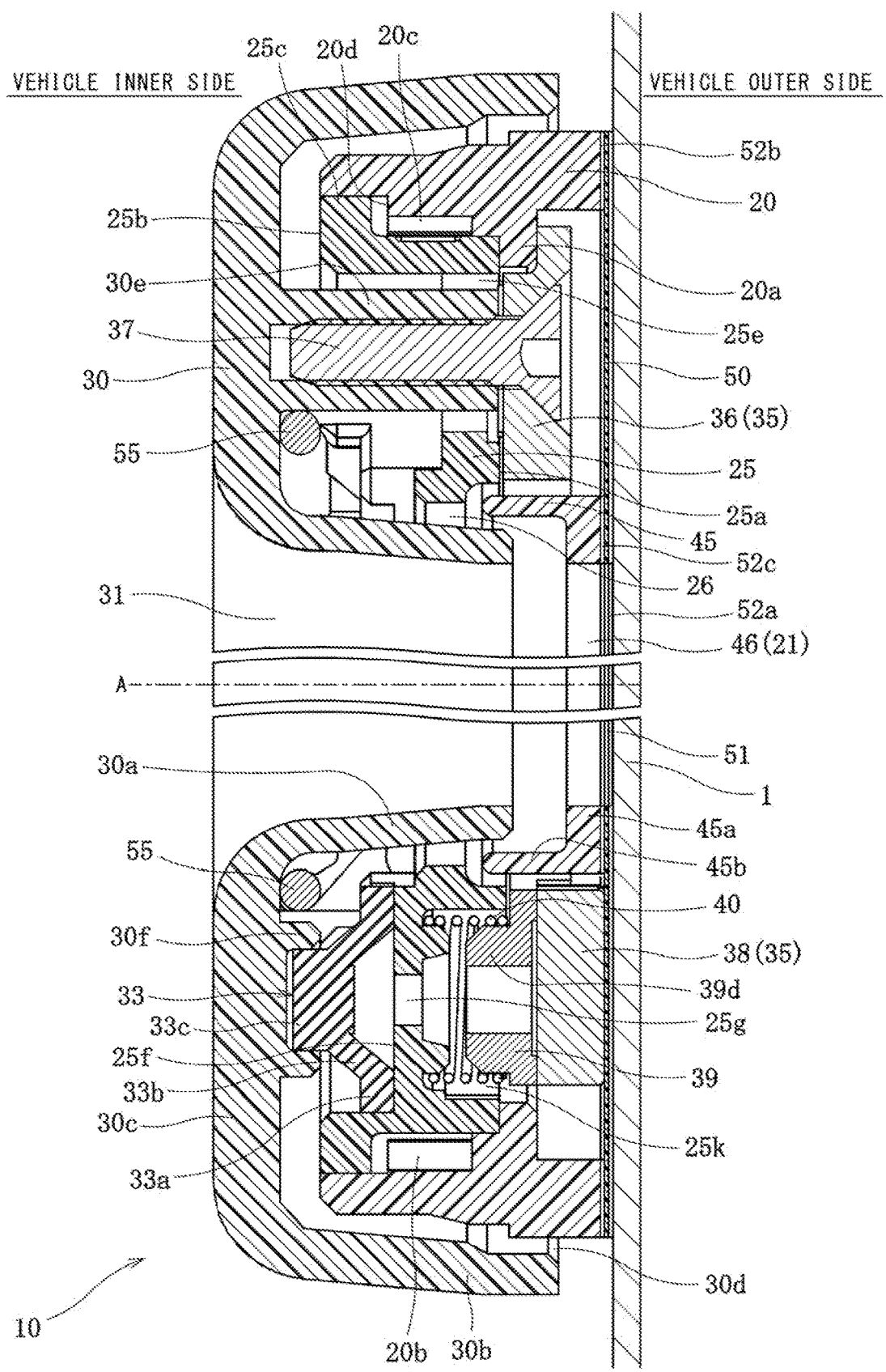
FIG. 2A is a cross-sectional view of the operation knob device of the first embodiment.

FIGS. 1 and 2A illustrate an operation knob device 10 according to a first embodiment of the present invention. A display panel 1 on which the operation knob device 10 is arranged has a touch detection function for detecting operation of the user by a change in capacitance, and is mounted on an in-vehicle product such as a navigation device or a center display.

As shown in FIG. 1, the operation knob device 10 is arranged in a defined operation area of the display panel 1 and projects from the display panel 1 to the vehicle inner side. The operation knob device 10 has an annular shape as a whole, and is arranged so that an axis A extends in the direction orthogonal to the display panel 1. The operation knob device 10 includes one knob (operation unit) 30, and transmits the push operation and rotation operation of the knob 30 to the display panel 1.

As shown in FIGS. 2A and 3, the operation knob device 10 includes a holder 20, a rotor 25, the knob 30, an energizing member 33, a transmission member 35, a ring member 45, and a film 50. The operation knob device 10 is fixed to the surface of the display panel 1 by the film 50 provided with an adhesive layer 52a. The transmission member 35 of the present embodiment includes a first transmission member 36 that transmits the push operation of the knob 30, and a second transmission member 38 that transmits the rotation operation of the knob 30.

The holder 20 and the ring member 45 are fixed to the film 50 so as to be adjacent to the display panel 1. The rotor 25 is arranged in the holder 20 so that rotation around the axis A is allowed. The knob 30 is attached to the rotor 25 so that linear movement in the direction along the axis A is allowed, and the rotor 25 is integrally rotated around the axis A. The energizing member 33 is arranged between the rotor 25 and the knob 30, and energizes the knob 30 in a direction away from the display panel 1. The first transmission member 36 is attached to the knob 30 and moves along the axis A in conjunction with the linear motion of the knob 30. The second transmission member 38 is attached to the rotor 25 and rotates integrally with the rotor 25.

Figure 2B:
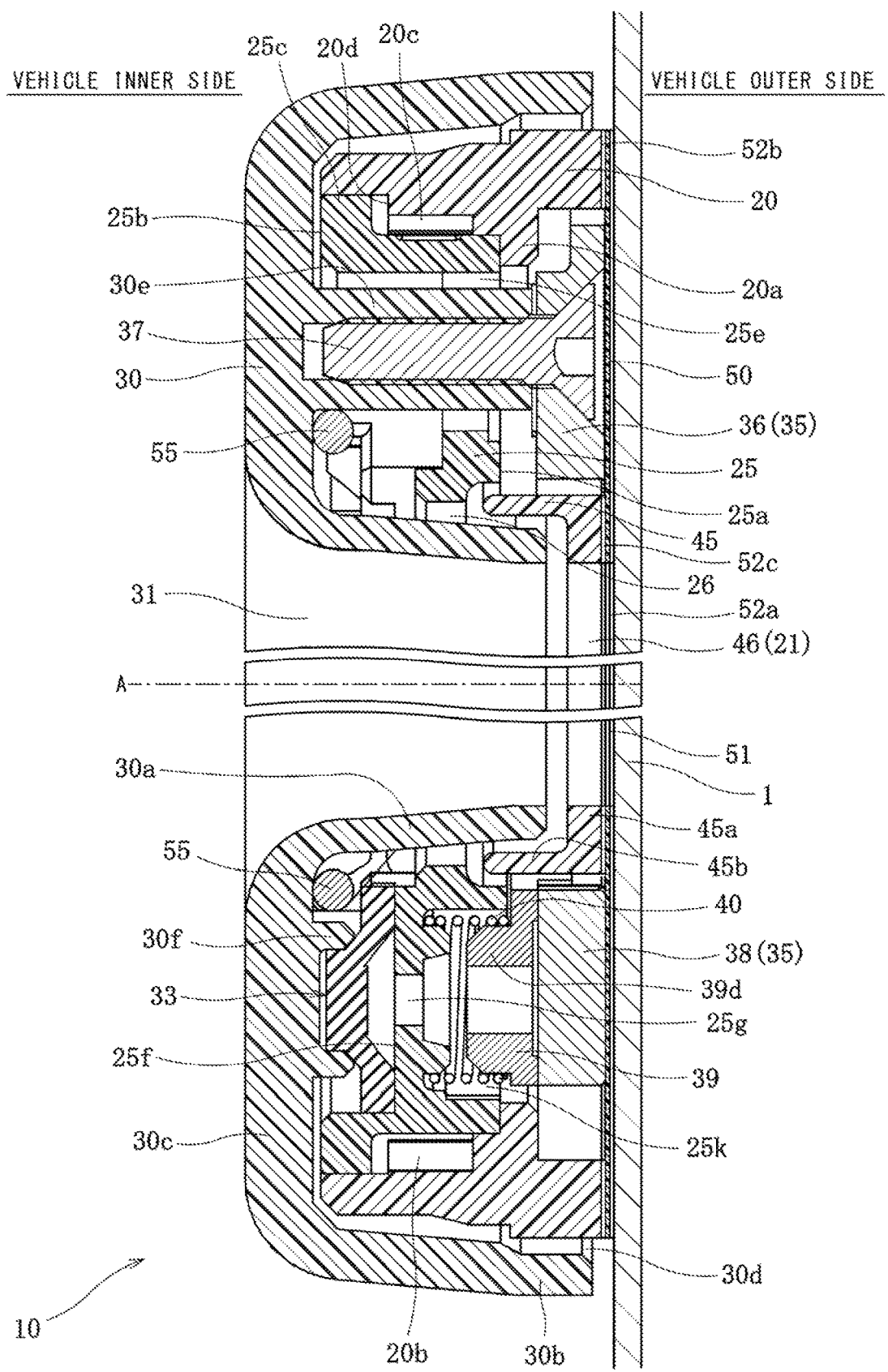
FIG. 2B is a cross-sectional view of the operation knob device for which push operation is performed.

As shown in FIG. 2B, when the knob 30 is pushed toward the display panel 1, the first transmission member 36 moves linearly toward the film 50. The display panel 1 can detect the push operation of the knob 30 as the capacitance is changed due to the approach of the first transmission member 36 having conductivity. When the hand is released from the knob 30, the knob 30 and the first transmission member 36 are moved away from the display panel 1 by the energizing member 33. The display panel 1 can detect the release of the push operation as there is no change in capacitance due to the first transmission member 36. In the push operation of the knob 30, the second transmission member 38 is kept in the state of being close to the display panel 1, and the area where the capacitance is changed by the second transmission member 38 in the display panel 1 does not change.

When the knob 30 is rotated in the state of FIG. 2A, the rotor 25 and the second transmission member 38 are integrally rotated in the same direction as the knob 30. The display panel 1 can detect the rotation operation of the knob 30 as the position where the capacitance changes moves (rotates) due to the rotation of the second transmission member 38 having conductivity. When the rotation operation is stopped, the rotation of the rotor 25 and the second transmission member 38 is also stopped. The display panel 1 can detect the stoppage of the rotation operation as the position where the capacitance changes is stopped. The display panel 1 can detect the execution, stop, or an adjustment amount of the function desired by the user by detecting a change stop position of the capacitance. In the rotation operation of the knob 30, the first transmission member 36 rotates integrally, while kept in the state of being away from the display panel 1. Accordingly, the capacitance of the display panel 1 does not change due to the first transmission member 36.

Next, a component of the operation knob device 10 will be specifically described. Note that, in the description below, the film 50 side closest to the display panel 1 may be referred to as the vehicle outer side, and an end wall portion 30c side of the knob 30 farthest from the display panel 1 may be referred to as the vehicle inner side.

As shown in FIGS. 3 and 4, the holder 20 is fixed to the outer peripheral portion of the film 50 and holds other components with respect to the display panel 1. The holder 20 is made from insulating (that is, non-conductive) resin (for example, ABS). The holder 20 is an annular cylinder provided with an opening (internal space) 21 that exposes part of the display panel 1.

The inner peripheral portion of the holder 20 is provided with an annular holding portion 20a that projects inward in the radial direction, restricts the movement of the rotor 25 to the vehicle outer side along the axis A, and rotatably holds the rotor 25 around the axis A. The holder 20 is arranged on the display panel 1 so that the axis A of the holding portion 20a extends in the direction orthogonal to the display panel 1. A plurality of triangular columnar protrusions 20b protruding inward in the radial direction are arranged side by side in the circumferential direction on the inner peripheral portion of the holder 20 so as to be adjacent on the vehicle inner side to the holding portion 20a. Between the protrusions 20b adjacent to each other in the circumferential direction, an engaging groove 20c for engaging an engaging member 28 described later is formed. An end on the vehicle inner side of the protrusion 20b is located on the vehicle outer side of an end on the vehicle inner side of the holder 20, and a step portion 20d is formed by these.

As shown in FIGS. 3 and 5, the rotor 25 is an annular plate body around the axis A having an opening (internal space) 26 communicating with an opening 21. The rotor 25 is made from insulating resin (for example, PBT). Also referring to FIG. 2A, the rotor 25 has a first end 25a that is arranged on the vehicle outer side and faces the film 50 (display panel 1), and a second end 25b that is arranged on the vehicle inner side and is located on the opposite side of the film 50. As the rotor 25 is arranged in the holding portion 20a, the first end 25a abuts on the holding portion 20a, and the second end 25b is located flush with a vehicle inner side end portion of the holder 20.

The outer diameter of the rotor 25 is larger than the inner diameter of the holding portion 20a and smaller than the diameter of a virtual circle (not shown) connecting tips of a plurality of the protrusions 20b. A flange portion 25c that protrudes outward in the radial direction and is arranged on the step portion 20d of the holder 20 is provided in an end portion on the second end 25b side of the rotor 25. The outer diameter of the flange portion 25c is larger than the diameter of the virtual circle connecting tips of a plurality of the protrusions 20b and smaller than the inner diameter of the step portion 20d. In this manner, the rotor 25 can rotate around the axis A inside the holder 20.

As shown in FIG. 3, a mounting hole 25d formed of space having a circular cross section that is recessed inward in the radial direction is provided on the outer periphery of the rotor 25. A spring 27 and the spherical engaging member 28 are arranged in the mounting hole 25d. The diameter of the engaging member 28 is smaller than the diameter of the mounting hole 25d and larger than a groove depth in the radial direction of the engaging groove 20c. When the rotor 25 is rotated with respect to the holder 20, the engaging member 28 moves to the inside of the mounting hole 25d due to an inclined surface of the protrusion 20b, and contracts the spring 27. The rotor 25 is held at a predetermined rotation angle position with respect to the holder 20 as the engaging member 28 energized outward by the spring 27 is engaged with the engaging groove 20c.

Figure 7:
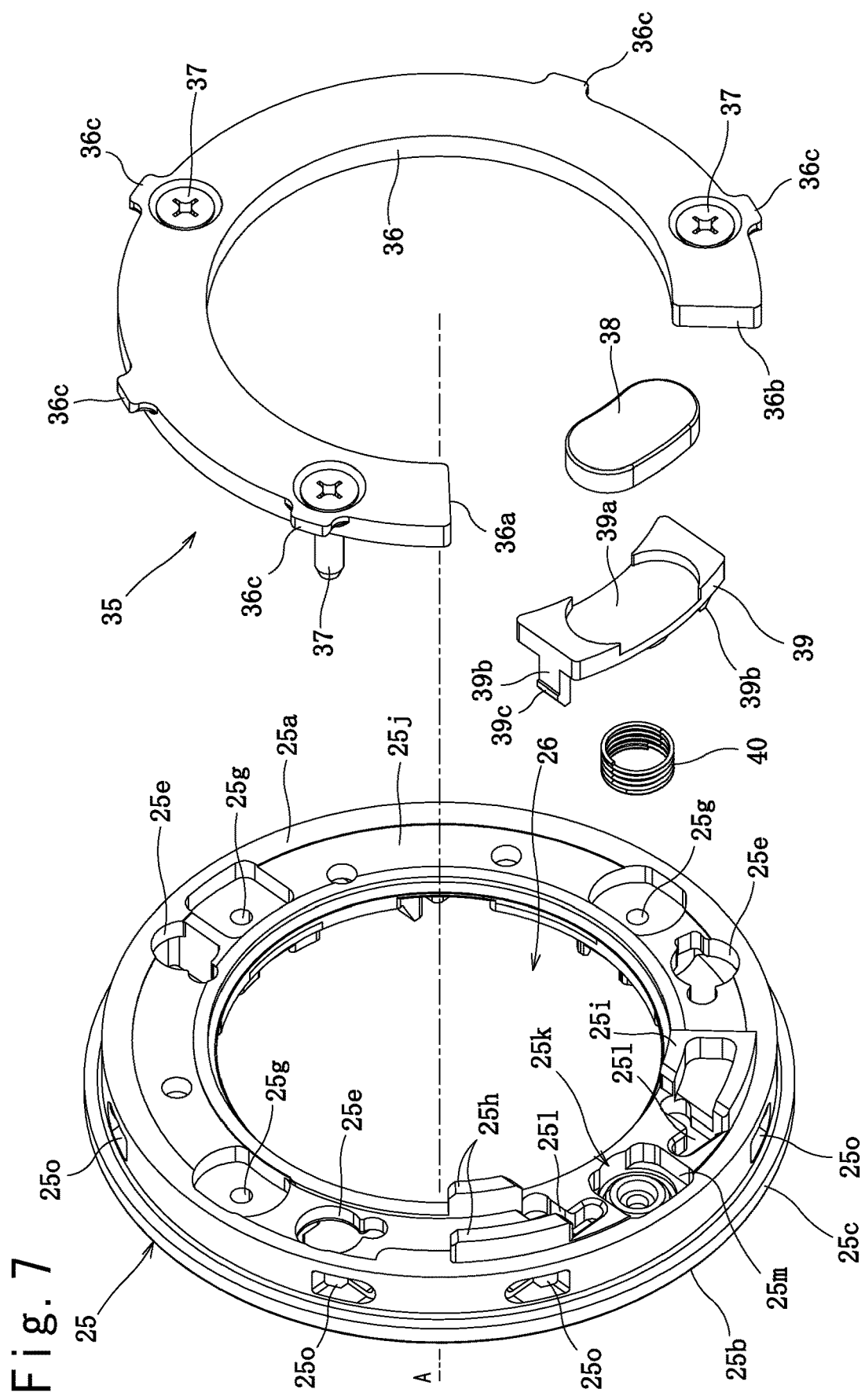
FIG. 7 is an exploded perspective view of the rotor, the first transmission member, and the second transmission member as viewed from below.

Referring to FIG. 2A, the rotor 25 is provided with an insertion hole 25e for allowing the knob 30 to move along the axis A. Referring to FIG. 6, on a side of the second end 25b of the rotor 25, an arrangement portion 25f in which the energizing member 33 is arranged and a recess 25n in which a stabilizer 55 described later is arranged are provided. Referring to FIG. 7, positioning ribs 25h and 25i that support the first transmission member 36 and a mounting portion 25k on which the second transmission member 38 is mounted are provided on a side of the first end 25a of the rotor 25. These will be described in detail later.

As shown in FIGS. 3 and 5, the knob 30 is an annular cover around the axis A having an opening 31 that communicates with the opening 21 and allows part of the display panel 1 to be visually recognized. The knob 30 is made from insulating resin (for example, PC/ABS). The knob 30 is arranged on a side of the second end 25b of the rotor 25 in such a manner that relative movement in the direction along the axis A with respect to the rotor 25 is allowed and relative movement in the circumferential direction around the axis A with respect to the rotor 25 is restricted.

Specifically, as shown in FIGS. 2A and 5, the knob 30 has a conical inner wall portion 30a defining the opening 31 and a conical cylindrical outer wall portion 30b surrounding the outer side of the inner wall portion 30a. The inner wall portion 30a is arranged in the openings 21 and 26 of the holder 21 and the rotor 25 so as to be located on the innermost side. The outer wall portion 30b is arranged on the outside of the holder 20 so as to be located on the outermost side. These have a concentric cylindrical shape around the axis A.

An end on the vehicle inner side in the inner wall portion 30a and the outer wall portion 30b is blocked by an end wall portion 30c connected to these. An end on the vehicle outer side in the inner wall portion 30a and the outer wall portion 30b is an opening portion 30d. That is, on the end wall portion 30c connected to the outer wall portion 30b, the opening 31 through which part of the display panel 1 can be visually recognized through the opening 21 is formed, and the inner wall portion 30a is continuously provided at the edge of the opening 31.

The inner wall portion 30a and the outer wall portion 30b are inclined so as to be separated from each other from the end wall portion 30c toward the opening portion 30d. The diameter of the outer end of the inner wall portion 30a located on the opening portion 30d side is smaller than the inner diameter of the rotor 25, and the outer end of the inner wall portion 30a protrudes to the vehicle outer side further than the rotor 25. The diameter of the outer end of the outer wall portion 30b located on the opening portion 30d side is larger than the outer diameter of the holder 20, and the outer end of the outer wall portion 30b protrudes to the vehicle outer side further than the rotor 25. Most of the holder 20 and the rotor 25 are housed inside the inner wall portion 30a, the outer wall portion 30b, and the end wall portion 30c.

Next, referring to FIGS. 2A and 5, the end wall portion 30c is provided with a cylindrical boss (connecting portion) 30e that penetrates the rotor 25 and projects to the opening portion 30d side (vehicle outer side). A plurality of the bosses 30e (three in the present embodiment) are provided at intervals in the circumferential direction on the end wall portion 30c. The total length of the boss 30e from the end on the end wall portion 30c side to the end on the opening portion 30d side is longer than the thickness of the rotor 25 from the second end 25b to the first end 25a and shorter than the total length of the inner wall portion 30a.

As shown in FIGS. 2A and 7, the rotor 25 is provided with the insertion holes 25e corresponding to each of a plurality of the bosses 30e. Referring to FIG. 6, the vehicle inner side of the insertion hole 25e spatially communicates with the recess 25n in which the stabilizer 55 is arranged. The insertion hole 25e is larger than the outer diameter of the boss 30e, allows the boss 30e to be inserted, and allows the boss 30e to move in the direction along the axis A. This allows the knob 30 to move relative to the rotor 25 in the direction along the axis A. Further, when the boss 30e abuts on the hole wall of the insertion hole 25e, the relative movement of the knob 30 with respect to the rotor 25 is restricted in the circumferential direction around the axis A.

Figure 9:
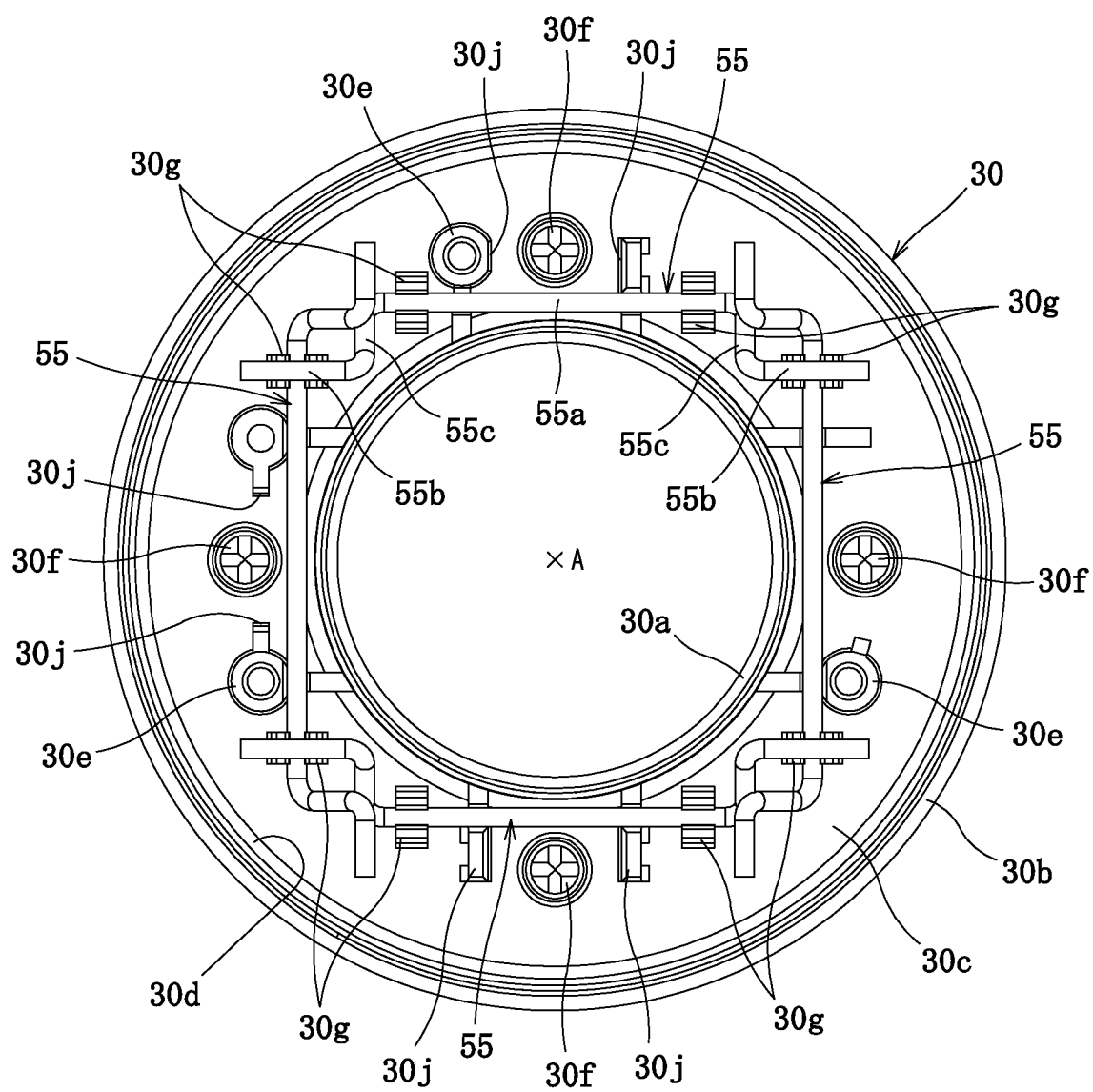
FIG. 9 is a front view illustrating the arrangement of the stabilizer with respect to the knob.

Referring to FIG. 9, the knob 30 is further provided with a restricting portion 30j having functions of guiding the movement of the rotor 25 in the direction along the axis A and restricting the movement of the rotor 25 in the circumferential direction around the axis A. The restricting portion 30j formed on the lower side in FIG. 9 is composed of a pair of ribs having a function of supporting the stabilizer 55, and a block 25r having the arrangement portion 25f shown in FIG. 6 is sandwiched between them. The restricting portion 30j formed on the left side in FIG. 9 is composed of a pair of ribs having a cylindrical shape and protruding from a pair of the bosses 30e, and the block 25r having the arrangement portion 25f shown in FIG. 6 is sandwiched between them. The restricting portion 30j formed on the upper side in FIG. 9 is composed of a pair of ribs having a function of supporting the stabilizer 55 and an outer peripheral portion of the boss 30e, and the block 25r having the arrangement portion 25f shown in FIG. 6 is sandwiched between them.

As shown in FIGS. 2A and 2B, the energizing member 33 is arranged between the rotor 25 and the knob 30 and energizes the knob 30 in the direction away from the rotor 25 along the axis A. The energizing member 33 is made from elastic rubber (for example, silicone rubber) and is formed in a substantially conical cylindrical shape. However, the energizing member 33 may be a coil spring or a leaf spring, or may be a resin spring having a raised structure provided in the rotor 25.

Specifically, as shown in FIGS. 5 and 6, a plurality (four in the present embodiment) of the energizing members 33 are arranged at equal intervals in the circumferential direction on a side of the second end 25b of the rotor 25. Each of the energizing members 33 includes an annular base 33a, a protrusion 33b protruding from the base 33a in a conical cylindrical shape, and a columnar head 33c provided at the tip of the protrusion 33b.

The second end 25b of the rotor 25 is provided with the arrangement portion 25f in which the energizing member 33 is arranged. The arrangement portion 25f is formed of a recess having a circular cross section on which the base 33a can be arranged, and is provided at an angle position different from that of the insertion hole 25e. The depth of the arrangement portion 25f in the direction in which the axis A extends is smaller than the total height of the energizing member 33, and the head 33c of the energizing member 33 projects from the second end 25b toward the knob 30 side. The bottom of the arrangement portion 25f is provided with a through hole 25g that penetrates to the first end 25a. The through hole 25g allows the flow of air due to the elastic deformation of the energizing member 33 shown in FIGS.

2A and 2B. A holding portion 30f for holding the head 33c of the energizing member 33 is provided on the inner surface of the end wall portion 30c of the knob 30.

As shown in FIGS. 2A and 5, the first transmission member 36 and the second transmission member 38 constituting the transmission member 35 are arranged between the inner wall portion 30a and the outer wall portion 30b and between the rotor 25 on the first end 25a side and the film 50. The first transmission member 36 is attached to the knob 30, and the second transmission member 38 is attached to the rotor 25. By the push operation of the knob 30, the first transmission member 36 moves along the axis A in conjunction, while the second transmission member 38 does not move. By the rotation operation of the knob 30, the first transmission member 36 is integrally rotated, and the second transmission member 38 is integrally rotated via the rotor 25. That is, the first transmission member 36 moves relative to the second transmission member 38 along the axis A, and does not move relative to the second transmission member 38 in the circumferential direction around the axis A.

As shown in FIGS. 5 and 7, the first transmission member 36 is a C-shaped plate made from conductive metal (for example, brass). However, the first transmission member 36 may be made from rubber or resin as long as the material has conductivity. The angle from a first end 36a to a second end 36b of the first transmission member 36 in the circumferential direction is approximately 270 degrees. The radial width of the first transmission member 36 is narrower than the radial width of the rotor 25.

As shown in FIG. 2A, the first transmission member 36 is connected to the boss 30e by a screw (connecting member) 37. By tightening the screw 37 penetrating the through hole of the first transmission member 36 to the boss 30e, the knob 30 and the first transmission member 36 are maintained in the mounted state with respect to the rotor 25. Further, a plurality of (five in this embodiment) protrusions 36c are provided on the outer peripheral portion of the first transmission member 36 so as to project outward in the radial direction and abut on the vehicle outer side end surface of the holding portion 20a.

With the knob 30 in the non-operated state, the first transmission member 36 retracts to a position close to the first end 25a of the rotor 25 when the protrusion 36c abuts on the holding portion 20a due to the energization of the energizing member 33. Further, the abutment of the protrusion 36c on the holding portion 20a restricts the further movement of the knob 30, the rotor 25, and the first transmission member 36 toward the vehicle inner side. As shown in FIG. 2B, the push operation of the knob 30 causes the first transmission member 36 to advance to a position in contact with the film 50 along the axis A.

Referring to FIG. 7, the first end 25a of the rotor 25 is provided with the positioning ribs 25h and 25i that assist in arranging the first transmission member 36 with respect to the rotor 25. A pair of the first positioning ribs 25h are provided so as to extend in the circumferential direction. The second positioning rib 25i is provided so as to project substantially in a U shape. Between a pair of the positioning ribs 25h and 25i, a recessed groove 25j recessed from the vehicle outer side to the vehicle inner side is provided in a portion where the first transmission member 36 is arranged.

As shown in FIGS. 5 and 7, the second transmission member 38 is an elliptical columnar plate made from conductive metal (for example, brass). However, the second transmission member 38 may be made from rubber or resin as long as the material has conductivity.

The second transmission member 38 is arranged between both the ends 36a and 36b so as to be located on a concentric circle with the first transmission member 36. The second transmission member 38 is arranged at the first end 25a of the rotor 25 with a holding member 39 interposed between them, and is energized to the vehicle outer side by a spring 40. As shown in FIG. 2A, with the knob 30 in the non-operated state, the second transmission member 38 protrudes further than the first transmission member 36 with respect to the first end 25a and abuts on the film 50.

Figure 8:
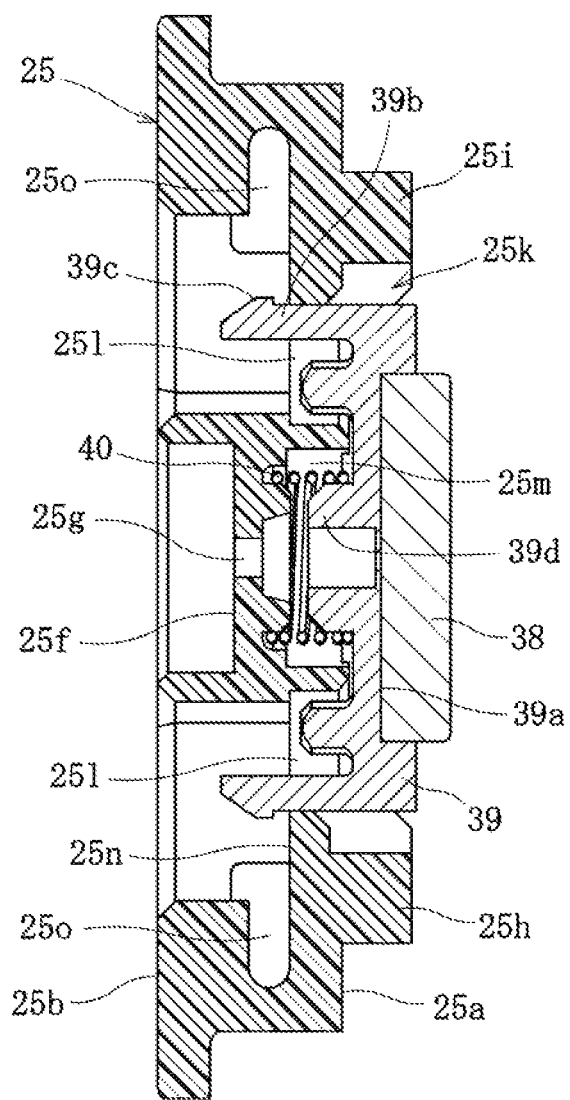
FIG. 8 is a cross-sectional view illustrating an arrangement structure of the second transmission member.

As shown in FIGS. 7 and 8, the holding member 39 includes an elliptical columnar recess 39a corresponding to the shape of the second transmission member 38. The depth of the recess 39a in the direction in which the axis A extends is smaller than the thickness of the second transmission member 38, and the second transmission member 38 protrudes from the end face of the holding member 39. The holding member 39 is provided with a pair of locking pieces 39b protruding to the vehicle inner side. The locking piece 39b includes a claw portion 39c for preventing separation from the rotor 25. A projection 39d at which one end of the spring 40 is arranged is provided in the center on the vehicle inner side of the holding member 39.

Next, referring to FIGS. 7 and 8, the first end 25a of the rotor 25 is provided with the mounting portion 25k on which the holding member 39 is mounted. The mounting portion 25k is provided adjacent to the vehicle outer side of one of a plurality of the arrangement portions 25f. The mounting portion 25k includes a pair of through holes 25l through which the locking piece 39b penetrates, and a recess 25m in which the spring 40 is arranged. Each of the through holes 25l is provided adjacent to the positioning ribs 25h and 25i. The vehicle inner side of the through hole 25l spatially communicates with the recess 25n in which the stabilizer 55 is arranged. The recess 25m is provided between a pair of the through holes 25l so as to be recessed from the vehicle outer side to the vehicle inner side. A gap that allows movement in the direction along the axis A of the holding member 39 with respect to the rotor 25 is secured between the edge of the through hole 25l located on a side of the second end 25b and the claw portion 39c.

As shown in FIGS. 3 and 4, the ring member 45 includes an opening 46 that communicates with the openings 21 and 31 to expose part of the display panel 1, and is an annular cylinder around the axis A. The ring member 45 is made from insulating resin (for example, ABS). The ring member 45 is arranged between a hole wall (inner peripheral surface) of the opening 26 of the rotor 25 and the inner wall portion 30a, that is, inside the rotor 25 and outside the inner wall portion 30a.

The ring member 45 includes a base 45a fixed to the inner peripheral portion of the film 50, and a protrusion 45b protruding into the knob 30 from the outer peripheral portion of the base 45a. The tip of the protrusion 45b located on the vehicle inner side is located closer to the end wall portion 30c side than the opening portion 30d of the knob 30 with the knob 30 in the non-operated state shown in FIG. 2A.

Next, referring to FIGS. 3 and 4, the film 50 is an annular member around the axis A and includes an opening 51 that exposes part of the display panel 1. The film 50 is made from resin (for example, PET) having excellent insulation, water resistance, and heat resistance. The film 50 has a thickness smaller than the minimum wall thickness of a resin molded product that can be manufactured by injection molding. Specifically, the thickness of the film 50 is preferably 0.05 mm or more and 0.2 mm or less, and is 0.1 mm in the present embodiment. The film 50 is fixed to the vehicle outer side end faces of the holder 20 and the ring member 45, and covers the display panel 1 side of the first transmission member 36 and the second transmission member 38.

The outer diameter of the film 50 is the same as the outer diameter of the maximum portion of the holder 20, and the inner diameter of the film 50 is the same as the inner diameter of the minimum portion of the ring member 45. Referring to FIG. 2A as well, in the film 50, the adhesive layer 52a is provided on the surface on the vehicle outer side facing the display panel 1. On the surface on the vehicle inner side of the film 50, an adhesive layer 52b for fixing the holder 20 is provided on the outer peripheral portion, and an adhesive layer 52c for fixing the ring member 45 is provided on the inner peripheral portion.

As shown in FIGS. 5 and 6, the operation knob device 10 includes the stabilizer 55 that suppresses the inclination of the knob 30 with respect to the rotor 25 during the push operation. A plurality of the stabilizers 55 are arranged between the rotor 25 and the end wall portion 30c of the knob 30. In the present embodiment, four of the stabilizers 55 are arranged at 90-degree intervals in the circumferential direction around the axis A.

Each of the stabilizers 55 includes a base portion 55a, a pair of slide portions 55b, and a pair of arm portions 55c and is formed of a wire.

As shown in FIG. 9, the base portion 55a is arranged adjacent to the radial outer side of the inner wall portion 30a. The base portions 55a of the stabilizers 55 adjacent to each other extend in the orthogonal directions.

The base portion 55a is rotatably held by a holding portion 30g projecting from the end wall portion 30c. The holding portion 30g is provided so as to be located near both ends in the longitudinal direction of the base portion 55a, is located on both sides of the base portion 55a, and includes a pair of claw portions for holding the base portion 55a.

The slide portion 55b is continuous with the base portion 55a with the arm portion 55c interposed between them and extends parallel to the base portion 55a. When viewed from the direction in which the axis A extends, the base portion 55a and the slide portion 55b of the stabilizers 55 adjacent to each other intersect in the orthogonal direction. That is, the base portion 55a of the first stabilizer 55 and the slide portion 55b of the second stabilizer 55 adjacent to the first stabilizer 55 intersect.

As shown in FIGS. 5 and 6, the slide portion 55b is arranged in the recess 25n formed at the second end 25b of the rotor 25, and is held by a slide groove 25o formed in the outer peripheral portion of the rotor 25.

The recesses 25n are provided at four locations at angular positions different from the insertion hole 25e and the arrangement portion 25f. The recess 25n has a bottom surface that is recessed from the vehicle inner side to the vehicle outer side and allows the slide portion 55b to move. The forming region of the recess 25n, the forming region of the insertion hole 25e, and the forming region of the through hole 25l spatially communicate with each other.

The slide groove 25o is an elongated hole that spatially communicates with the recess 25n and penetrates from the recess 25n to the outer peripheral surface of the rotor 25. A total of eight of the slide grooves 25o is provided, two in each of the recesses 25n. A pair of the slide grooves 25o formed in one of the recesses 25n extend in the orthogonal directions, and a different one of the slide portions 55b of the stabilizer 55 is arranged in each. By arranging the tip of the slide portion 55b in the slide groove 25o, the slide portion 55b is allowed to move along the second end 25b.

As shown in FIGS. 6 and 9, the arm portion 55c is continuous with the outer end of the base portion 55a and the inner end of the slide portion 55b. The arm portion 55c extends in a direction orthogonal to the base portion 55a and the slide portion 55b. As described above, since the base portion 55a is held by the knob 30 and the slide portion 55b is held by the rotor 25, the arm portion 55c is inclined with respect to the bottom surface of the recess 25n. Due to this inclination, the arm portions 55c of the stabilizers 55 adjacent to each other are arranged three-dimensionally without interference.

Note that the rotor 25 may be provided with a holding portion for holding the base portion 55a, and the knob 30 may be provided with a slide groove for holding the slide portion 55b.

Next, the operation of the operation knob device 10 will be described.

As shown in FIG. 2A, with the knob 30 in the non-operated state, the knob 30 is held at a position separated from the rotor 25 by the energization of the energizing member 33. In this manner, the first transmission member 36 connected to the boss 30e is located away from the film 50. Further, the second transmission member 38 is held at a position abutting on the film 50 by the energization of the spring 40.

In this non-operated state, in the display panel 1, the capacitance of a portion facing the first transmission member 36 does not change, and only the capacitance of a portion facing the second transmission member 38 changes. However, the position where the capacitance is changed by the second transmission member 38 is maintained at a predetermined position. Therefore, the display panel 1 can detect that the knob 30 is not operated.

When the knob 30 is pushed, the knob 30 approaches the rotor 25 against the energizing force of the energizing member 33. At this time, the base portion 55a of the stabilizer 55 is pressed by the linear motion of the knob 30, and the slide portion 55b moves along the bottom surface of the recess 25n and the slide groove 25o. In this manner, the inclination of the knob 30 with respect to the rotor 25 is suppressed. Further, the linear motion of the knob 30 causes the first transmission member 36 to approach or come into contact with the film 50 with the boss 30e interposed between them.

By the push operation, the capacitance of the display panel 1 changes not only in the portion facing the second transmission member 38 but also in the portion facing the first transmission member 36. Therefore, the area where the capacitance of the display panel 1 changes is wider than that in the non-operated state. By the increase in the change area of the capacitance, the display panel 1 can detect the push operation of the knob 30.

When the push operation is stopped, the energizing force of the energizing member 33 causes the knob 30 and the first transmission member 36 to move to the vehicle inner side with respect to the rotor 25. In this manner, in the display panel 1, the change in the capacitance of the portion facing the first transmission member 36 no longer occurs, so that the area where the capacitance changes becomes local as compared with that in the push operation state. By the decrease in the change area of the capacitance, the display panel 1 can detect release of the push operation of the knob 30.

When the knob 30 is rotated, the second transmission member 38 rotates together with the rotor 25 interposed between them. At this time, since the knob 30 is held away from the rotor 25 by the energizing member 33, the first transmission member 36 is also kept away from the film 50.

Due to the rotation operation, in the display panel 1, the capacitance of the portion facing the first transmission member 36 does not change, and only the capacitance of the portion facing the second transmission member 38 changes, where the changing position rotates around the axis A. Therefore, the display panel 1 can detect the rotation operation of the knob 30, including the direction in which the knob 30 rotates (clockwise or counterclockwise).

When the rotation operation is stopped, the rotation of the rotor 25 and the second transmission member 38 is also stopped. In this manner, on the display panel 1, the movement of the position where the capacitance changes is stopped. Therefore, the display panel 1 can detect the stoppage of the rotation operation of the knob 30.

The operation knob device 10 configured as described above has the features described below.

Since the holder 20, the rotor 25, and the knob 30 are formed in an annular shape and part of the display panel 1 can be visually recognized through the openings 21 and 31, the display area of the display panel 1 can be secured. Further, since the first transmission member 36 and the second transmission member 38 are collectively arranged between the inner wall portion 30a and the outer wall portion 30b of the knob 30, the operation knob device 10 can be reduced in size.

The knob 30 has the boss 30e that penetrates the rotor 25 and projects toward the first end 25a, and the first transmission member 36 is attached to the boss 30e. Therefore, the push operation of the knob 30 can be reliably transmitted to the first transmission member 36, and the first transmission member 36 can be brought closer to the display panel 1, so that the display panel 1 can reliably detect the push operation of the knob 30.

The energizing member 33 that energizes the knob 30 in a direction away from the rotor 25 is provided between the rotor 25 and the knob 30. Therefore, when the push operation of the knob 30 is stopped, the first transmission member 36 can be reliably separated from the display panel 1 via the knob 30. Further, since the energizing member 33 is arranged between the knob 30 and the rotor 25 that rotates integrally with the knob 30, the degree of freedom in arrangement of the energizing member 33 can be improved, and the operation knob device 10 can also be reduced in size.

A plurality of the stabilizers 55 that suppress the inclination of the knob 30 with respect to the rotor 25 are provided between the rotor 25 and the knob 30, and the base portions 55a of the stabilizers 55 adjacent to each other are arranged so as to extend in the orthogonal directions. Accordingly, operability of the knob 30 can be improved. Since the base portion 55a and the slide portion 55b of the stabilizers 55 adjacent to each other are arranged so as to intersect with each other, the total length of the base portion 55a can be made as long as possible. Therefore, the inclination of the knob 30 can be reliably suppressed. Further, since the base portion 55a can be arranged along the inner peripheral portion of the rotor 25, the outer shape of the operation knob device 10 can be reduced.

Since the first transmission member 36 and the second transmission member 38 are arranged concentrically, the width of the knob 30 (the distance between the inner wall portion 30a and the outer wall portion 30b) can be narrowed. Therefore, since the opening 31 at the center of the knob 30 can be secured large, the area of the display panel 1 that can be recognized through the opening 31 can be secured, and the recognizability can be improved.

Second Embodiment

Figure 10:
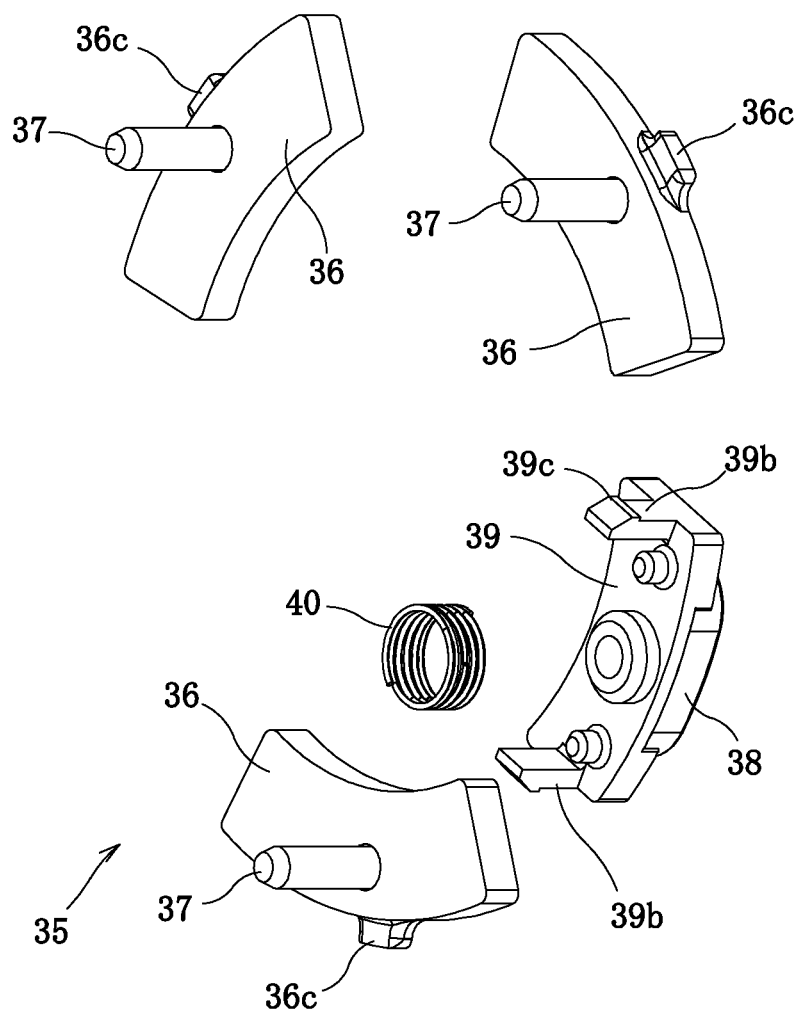
FIG. 10 is a perspective view illustrating a transmission member of the operation knob device of a second embodiment.

FIG. 10 shows the transmission member 35 of the operation knob device 10 of the second embodiment. The second embodiment is different from the first embodiment in that the first transmission member 36 is divided into a plurality of parts in the circumferential direction. In the illustrated example, the first transmission member 36 is divided by the same number as the number of the screws 37 corresponding to the bosses 30e of the knob 30. The second embodiment configured in this way can obtain a function and an effect similar to those of the first embodiment.

Third Embodiment

Figure 11:
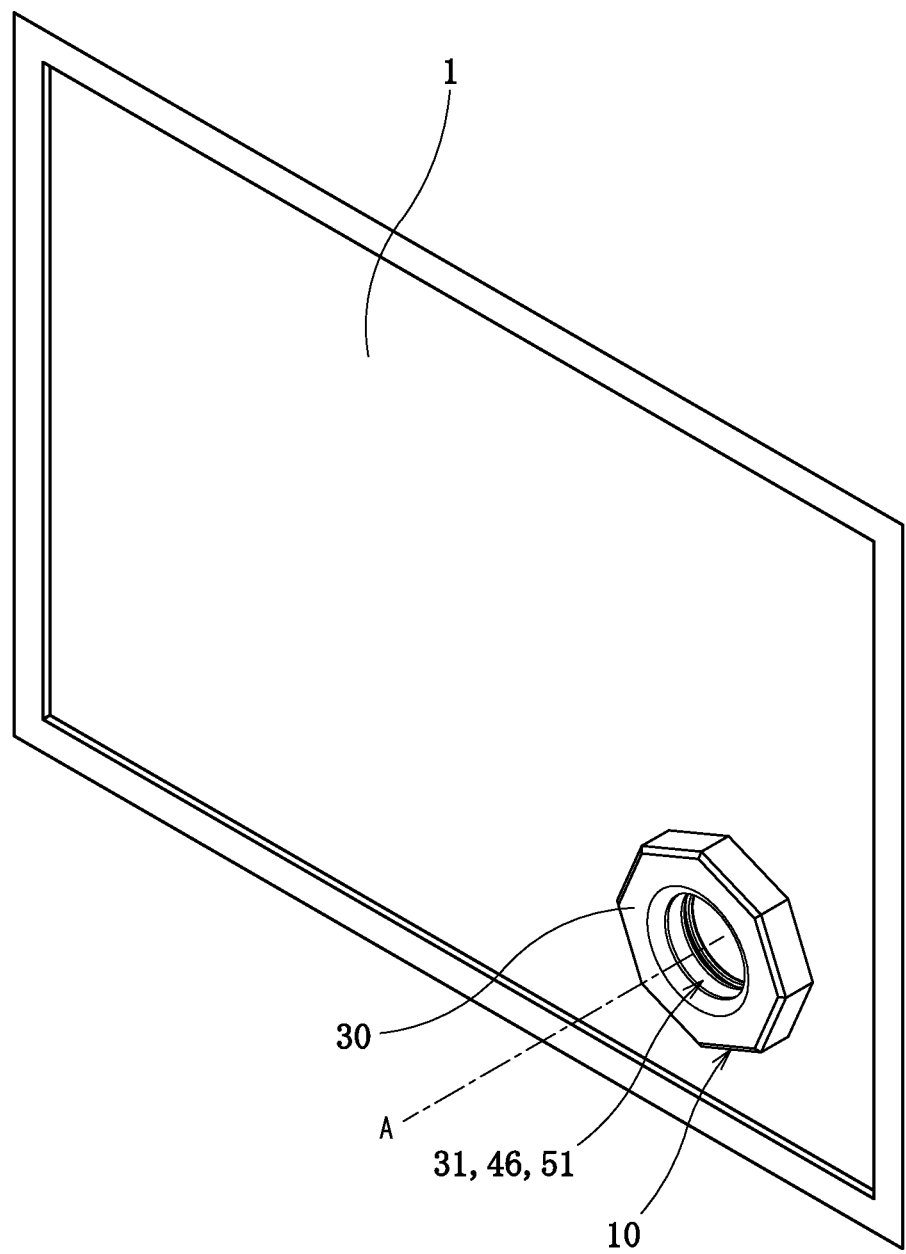
FIG. 11 is a perspective view illustrating the operation knob device according to a third embodiment.

FIG. 11 illustrates the operation knob device 10 of a third embodiment. The third embodiment is different from the first embodiment in that the outer shape of the knob 30 is polygonal (octagonal). The third embodiment configured in this way can obtain a function and an effect similar to those of the first embodiment.

Note that the operation knob device 10 of the present invention is not limited to the configuration of the above embodiment, and various changes can be made.

For example, a plurality of the divided first transmission members 36 shown in the second embodiment and the polygonal knob 30 shown in the third embodiment may be combined as necessary.

The holding portion 20a is not limited to an annular shape, and the inner peripheral portion or the outer peripheral portion on which the rotor 25 is arranged only has to be circular. Further, the holding portion 20a is not limited to a configuration continuous in the circumferential direction, and may be an annular shape discontinuous (intermittent) in the circumferential direction.

The holder 20 is not limited to an annular one, and at least either one of the outer peripheral surface and the inner peripheral surface may have a polygonal shape. Of the knob 30, not only the shape of the outer peripheral portion but also the shape of the inner peripheral portion may be a polygonal shape. The shape of the ring member 45 is not limited to an annular shape, and can be changed as needed.

The connecting structure (connecting portion) between the knob 30 and the first transmission member 36 is not limited to the boss 30e and the screw 37, and can be changed as needed as long as the first transmission member 36 can be connected so as to be able to move linearly in conjunction with the knob 30. The connecting structure of the second transmission member 38 to the rotor 25 is not limited to the holding member 39 and the spring 40, and can be changed as needed.

The number of the stabilizers 55 is not limited to four, and may be only two, that is, the number of the stabilizers 55 arranged so as to extend in the orthogonal directions. As a matter of course, the number of the stabilizers 55 may be three or five or more.

The operation knob device 10 of the present invention can be used for a product other than in-vehicle products as long as the product is mounted with the display panel 1 having a touch detection function.

What is claimed is:
1. An operation knob device comprising:
an annular holder having an annular holding portion and arranged adjacent to a display panel so that an axis of the holding portion intersects with the display panel;
an annular rotor that has a first end facing the display panel and a second end located on a side opposite to the display panel with respect to the first end, and is arranged in the holding portion so as to allow rotation around the axis;

an annular knob arranged on a side of the second end of the rotor so that relative movement in a direction along the axis with respect to the rotor is allowed and relative movement in a circumferential direction around the axis with respect to the rotor is restricted;

a conductive first transmission member arranged on a side of the first end of the rotor so as to move along the axis in conjunction with the knob; and a conductive second transmission member attached to the first end so as to rotate integrally with the rotor, wherein the knob has a cylindrical inner wall portion that defines an opening through which part of the display panel can be visually recognized through an internal space of the holder and the rotor, and a cylindrical outer wall portion that surrounds an outer side of the inner wall portion, and the first transmission member and the second transmission member are arranged between the inner wall portion and the outer wall portion.

2. The operation knob device according to claim 1, wherein
the knob has a connecting portion that penetrates the rotor and projects toward the side of the first end, and
the first transmission member is attached to the connecting portion.

3. The operation knob device according to claim 2, wherein an energizing member that energizes the knob in a direction away from the rotor is provided between the rotor and the knob.

4. The operation knob device according to claim 1, wherein an energizing member that energizes the knob in a direction away from the rotor is provided between the rotor and the knob.

* * * * *